United States Patent
Heo

(10) Patent No.: US 8,430,642 B2
(45) Date of Patent: Apr. 30, 2013

(54) CONTROLLING APPARATUS FOR LINEAR COMPRESSOR

(75) Inventor: Jung-wan Heo, Gimhae-shi (KR)

(73) Assignee: LG Electronics Inc., Seoul (KR)

( * ) Notice: Subject to any disclaimer, the term of this patent is extended or adjusted under 35 U.S.C. 154(b) by 999 days.

(21) Appl. No.: 12/309,919

(22) PCT Filed: Aug. 3, 2007

(86) PCT No.: PCT/KR2007/003757
§ 371 (c)(1),
(2), (4) Date: Feb. 3, 2009

(87) PCT Pub. No.: WO2008/016285
PCT Pub. Date: Feb. 7, 2008

(65) Prior Publication Data
US 2009/0208347 A1   Aug. 20, 2009

(30) Foreign Application Priority Data
Aug. 4, 2006   (KR) .................. 10-2006-0073941

(51) Int. Cl.
*F04B 49/06* (2006.01)
(52) U.S. Cl.
USPC ........................ 417/44.11; 417/44.1
(58) Field of Classification Search ............ 417/44.11, 417/44.1
See application file for complete search history.

(56) References Cited

U.S. PATENT DOCUMENTS

| 2003/0209015 A1* | 11/2003 | Song ............................ 62/6 |
| 2004/0042904 A1* | 3/2004 | Kim ........................ 417/44.11 |
| 2005/0031470 A1 | 2/2005 | Lee |
| 2005/0287011 A1* | 12/2005 | Park et al. .............. 417/44.11 |

FOREIGN PATENT DOCUMENTS

| JP | 11-351143 A | 12/1999 |
| KR | 2002/0041984 A | 6/2002 |

OTHER PUBLICATIONS

Yee-Pien Yang et al.; "Dual Stroke and Phase Control and System Identification of Linear Compressor of a Split-Stirling Cryocooler"; Proceedings of the 38$^{th}$ IEEE Conference on Decision and Control; vol. 5, Dec. 7-10, 1999; pp. 5120-5124.

* cited by examiner

*Primary Examiner* — Anh Mai
*Assistant Examiner* — Zachary J Snyder
(74) *Attorney, Agent, or Firm* — McKenna Long & Aldridge LLP

(57) ABSTRACT

The present invention discloses a controlling apparatus and method for a linear compressor which can provide an efficient control, by selectively performing an operation which is not affected by a capacitor and an operation which does not include a phase control according to a load. The controlling apparatus for the linear compressor includes an LC path (P1) composed of a coil winding portion (L) of the linear compressor and a capacitor (CP)1 a phase control path (P2) composed of the coil winding portion (L) and a phase control unit, and a switch means (62) for selectively applying power to one of the LC path (P1) and the phase control path (P2).

7 Claims, 3 Drawing Sheets

CONTROLLING APPARATUS FOR LINEAR COMPRESSOR

This application is a national stage entry of International Application No. PCT/KR2007/003757, filed Aug. 3, 2007, and claims the benefit of Korean Application No. 10-2006-0073941, filed on Aug. 4, 2006, both of which is hereby incorporated by reference, in their entireties, for all purposes as if fully set forth herein.

TECHNICAL FIELD

The present invention relates to a linear compressor, and more particularly, to a controlling apparatus and method for a linear compressor which can provide an efficient control, by selectively performing an operation which is not affected by a capacitor and an operation which does not include a phase control according to a load degree.

BACKGROUND ART

In general, a compressor, which is an apparatus for converting mechanical energy into compressed energy of a compressive fluid, is used as a part of a freezing system, for example, a refrigerator and an air conditioner. Among the compressors, a reciprocating compressor sucks, compresses and discharges a refrigerant gas by linearly reciprocating an inner piston inside a cylinder. Driving types of the piston are divided into a recipro type and a linear type. A linear motor is used in the linear type.

As the linear motor itself directly generates a linear driving force, the linear compressor does not need a mechanical conversion system, simplifies the structure, and decreases an energy conversion loss. In addition, as a connection portion causing friction and abrasion does not exist, the linear compressor can considerably reduce noises. In the case that the linear compressor is employed in a refrigerator or an air conditioner, since a stroke voltage applied to the linear compressor can be changed to vary a compression ratio, the linear compressor can be used for a variable cooling control. However, in the case of the reciprocating compressor, particularly, in the case of the linear type, the piston reciprocates inside the cylinder in a state where it is not mechanically restricted. Accordingly, if an excessive voltage is abruptly applied, the piston runs against the cylinder wall, and if a load is large, the piston does not move forward, which results in abnormal compression. It is thus essential to control the piston to regulate the movement of the piston with regard to the variation of the load or the voltage.

FIG. 1 is a configuration view illustrating a conventional controlling apparatus for a linear compressor. The conventional controlling apparatus for the linear compressor includes a power unit 400 with a predetermined frequency for supplying AC power, a linear compressor 100 with a predetermined inductance L connected to the power unit 400 and provided with a coil wound motor, a sensor unit 500 for sensing a voltage and a current applied to the linear compressor 100, a microcomputer 600 for receiving a signal from the sensor unit 500 and outputting a control signal, a control unit 300 connected to the linear compressor 100, a capacitor 200 with a capacitance C connected in series to the linear compressor 100, a value (resonance frequency) obtained by multiplying the capacitance C by the inductance L of the linear compressor 100 being larger than the frequency of the power unit 400, and a switch unit 700 for bypassing the current flowing through the control unit 300 according to the control signal from the microcomputer 600.

When the microcomputer 600 judges a current condition as a normal condition in which a load variation is not serious, the microcomputer 600 applies the control signal to the control unit 300, so that input power passes therethrough. For this control, the capacitor 200 with the sufficiently small capacitance C must be used in the prior art.

FIG. 2 is a graph showing current and voltage waveforms in FIG. 1.

A stroke of the linear compressor 100 of FIG. 1 is controlled through a current phase control using the control unit 300 by controlling the switch unit 700. In this state, FIG. 2 shows phases of a current I and a voltage II applied to the linear compressor 100. As shown in FIG. 2, in the conventional controlling apparatus, the capacitor 200 with the sufficiently small capacitance C is connected in series to the linear compressor 100 and the control unit 300, so that the phase of the current I applied to the linear compressor 100 and the control unit 300 precedes the phase of the voltage II by a phase difference.

Due to the phase difference between the current I and the voltage II, when the microcomputer 600 sends an on driving signal to the control unit 300 when the voltage II is over 0 V, since the current I has been relatively reduced, a required driving force is not transferred to the linear compressor 100. As the phase of the current I precedes the phase of the voltage II, a necessary driving force is not generated. Moreover, such a phase difference lowers efficiency of the consumed power.

DISCLOSURE OF INVENTION

Technical Problem

The present invention is achieved to solve the above problems. An object of the present invention is to provide a controlling apparatus and method for a linear compressor which can efficiently perform an AC phase control, by preventing a phase of a current from preceding a phase of a voltage during the phase control.

Another object of the present invention is to provide a controlling apparatus and method for a linear compressor which can improve power consumption efficiency and control efficiency, by changing a control mode according to a load degree.

Technical Solution

In order to achieve the above-described objects of the invention, there is provided a controlling apparatus for a linear compressor, including: an LC path composed of a coil winding portion of the linear compressor and a capacitor; a phase control path composed of the coil winding portion and a phase control unit; and a switch means for selectively applying power to one of the LC path and the phase control path. Therefore, the controlling apparatus can change a control mode.

The controlling apparatus includes a control means for controlling the switch means according to a load degree of the linear compressor. Accordingly, the controlling apparatus can perform the control in cooperation with the load degree.

Preferably, the LC path is formed of a serial connection of the oil winding portion and the capacitor.

Preferably, the phase control path is formed of a serial connection between the coil winding portion and the phase control unit.

In addition, there is provided a controlling method for a linear compressor, including the steps of: judging a load state of the linear compressor; and selecting an LC path or a phase control path according to the load state.

Preferably, the selecting step selects the phase control path when the load state is a high load or a low load, and selects the LC path when the load state is a middle load.

There is also provided a controlling apparatus for a linear compressor, including: a coil winding portion of the linear compressor with one end connected to an external power source; a capacitor with one end connected to the other end of the coil winding portion and the other end connected to a first contact point of a switch unit; a phase control unit with one end connected to the other end of the coil winding portion and the other end connected to a second contact point of the switch unit; and the switch unit including the first contact point, the second contact point, and a selecting unit with one end selectively connected to the first contact point or the second contact point and the other end connected to the external power source, and selectively applying external power to the capacitor or the phase control unit.

Preferably, the selecting unit operates in cooperation with a load degree of the linear compressor.

Preferably, the selecting unit applies power to the phase control unit when the load degree is a high load or a low load, and applies power to the capacitor when the load degree is a middle load.

Advantageous Effects

In accordance with the present invention, as the phase of the current does not proceed the phase of the voltage during the phase control, the AC phase control can be efficiently conducted.

In accordance with the present invention, as the control mode is changed according to the load degree, power consumption efficiency and control efficiency can be improved.

BRIEF DESCRIPTION OF THE DRAWINGS

The present invention will become better understood with reference to the accompanying drawings which are given only by way of illustration and thus are not limitative of the present invention, wherein.

BEST MODE FOR CARRYING OUT THE INVENTION

A controlling apparatus and method for a linear compressor in accordance with preferred embodiments of the present invention will be described in detail with reference to the accompanying drawings.

Figure 3:
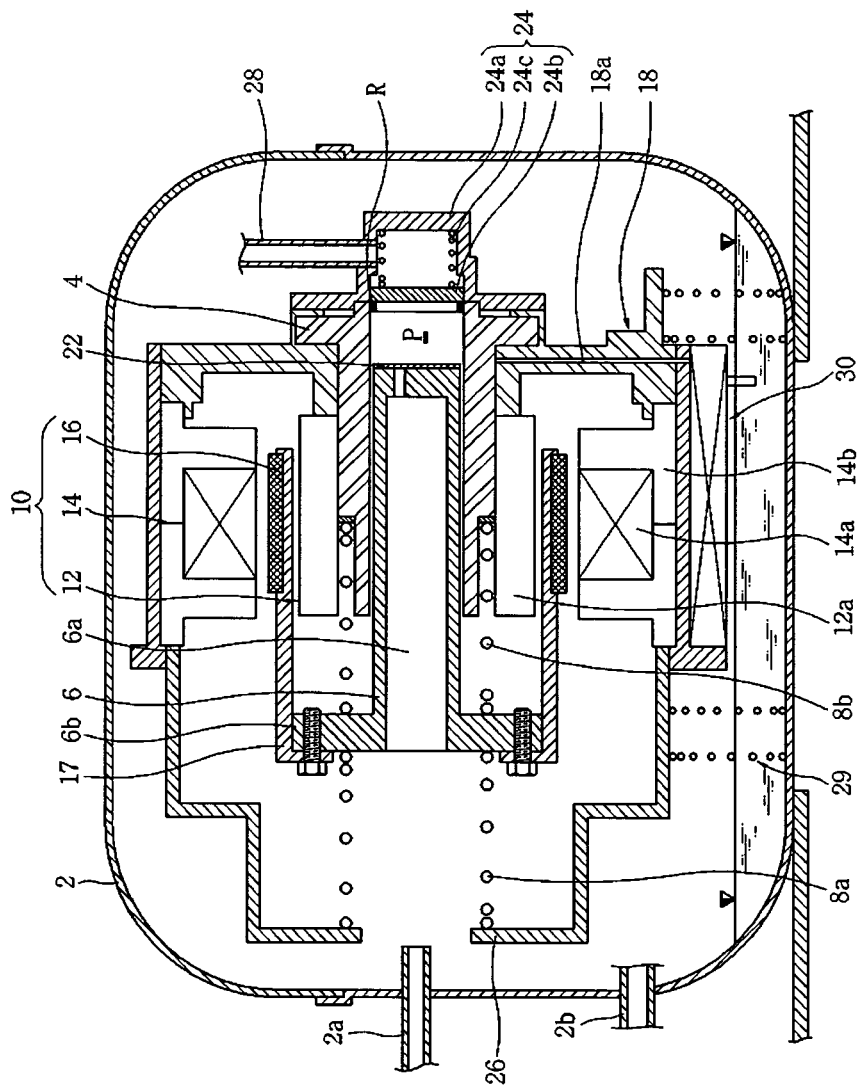
FIG. 3 is a cross-sectional view illustrating a linear compressor in accordance with the present invention.

FIG. 3 is a cross-sectional view illustrating a linear compressor in accordance with the present invention. As illustrated in FIG. 3, in the linear compressor according to the present invention, an inlet tube 2a and an outlet tube 2b for letting a refrigerant in and out are installed at one side of a hermetic container 2, a cylinder 4 is fixedly installed in the hermetic container 2, a piston 6 is installed inside the cylinder 4 to be linearly reciprocatable, for compressing the refrigerant sucked into a compression space P in the cylinder 4, and various springs are installed to elastically support the piston 6 in the motion direction of the piston 6. The piston 6 is connected to a linear motor 10 for generating a linear reciprocation driving force.

A suction valve 22 is installed at one end of the piston 6 contacting the compression space P. A discharge valve assembly 24 is installed at one end of the cylinder 4 contacting the compression space P. The suction valve 22 and the discharge valve assembly 24 are automatically controlled to be open and close according to the inner pressure of the compression space P, respectively.

Upper and lower shells are coupled to each other so that the hermetic container 2 can be sealed hermetically. The inlet tube 2a for introducing the refrigerant and the outlet tube 2b for discharging the refrigerant are installed at one side of the hermetic container 2. The piston 6 is elastically supported inside the cylinder 4 in the motion direction to be linearly reciprocatable, and the linear motor 10 is coupled to the outside of the cylinder 4 by a frame 18, to thereby constitute an assembly. Such an assembly is elastically supported on the inner bottom face of the hermetic container 2 by supporting springs 29.

A predetermined amount of oil is filled in the inner bottom face of the hermetic container 2. An oil pumping device 30 for pumping the oil is installed at the bottom end of the assembly. An oil supply tube 18a is formed in the frame 18 placed at the lower portion of the assembly, for supplying the oil to the gap between the piston 6 and the cylinder 4. Therefore, the oil supply device 30 pumps the oil by the vibration generated by the linear reciprocation of the piston 6. The oil is supplied to the gap between the piston 6 and the cylinder 4 along the oil supply tube 18a for cooling and lubrication.

The cylinder 4 is formed in a hollow shape so that the piston 6 can linearly reciprocate therein. The compression space P is defined at one side of the cylinder 4. In a state where one end of the cylinder 4 is positioned closely to the inside of the inlet tube 2a, the cylinder 4 is preferably installed on the same straight line with the inlet tube 2a. The piston 6 is installed inside one end of the cylinder 4 close to the inlet tube 2a to be linearly reciprocatable, and the discharge valve assembly 24 is installed at one end of the cylinder 4 opposite to the inlet tube 2a.

The discharge valve assembly 24 includes a discharge cover 24a installed to define a predetermined discharge space at one end of the cylinder 4, a discharge valve 24b installed to open and close one end of the cylinder 4 on the side of the compression space P, and a valve spring 24c, which is a kind of coil spring, for applying an elastic force in the axial direction between the discharge cover 24a and the discharge valve 24b. An O-ring R is fitted into the inner circumference of one end of the cylinder 4, so that the discharge valve 24a is closely adhered to the one end of the cylinder 4.

A curvedly-formed loop pipe 28 is connected between one side of the discharge cover 24a and the outlet tube 2b. The loop pipe 28 not only guides the external discharge of the compressed refrigerant, but also buffers the vibration generated by the interactions of the cylinder 4, the piston 6 and the linear motor 10, when it is transferred to the whole hermetic container 2.

While the piston 6 linearly reciprocates inside the cylinder 4, if the pressure of the compression space P is over a predetermined discharge pressure, the valve spring 24c is compressed to open the discharge valve 24b. The refrigerant is discharged from the compression space P, and then completely discharged to the outside along the loop pipe 28 and the outlet tube 2b.

A refrigerant passage 6a is defined at the center portion of the piston 6 so that the refrigerant introduced from the inlet tube 2a can flow therethrough. The linear motor 10 is connected directly to one end of the piston 6 close to the inlet tube 2a by a connection member 17, and the suction valve 22 is installed at one end of the piston 6 opposite to the inlet tube 2a. The piston 6 is elastically supported in the motion direction by various springs.

The suction valve 22 is formed in a thin plate shape with its center portion partially cut to open and close the refrigerant passage 6a of the piston 6 and with its one side fixed to one end of the piston 6 by a screw.

Accordingly, when the piston 6 linearly reciprocates inside the cylinder 4, if the pressure of the compression space P is below a predetermined suction pressure which is lower than the discharge pressure, the suction valve 22 is open, so that the refrigerant is supplied into the compression space P. Meanwhile, if the pressure of the compression space P is over the predetermined suction pressure, the suction valve 22 is closed, so that the refrigerant is compressed in the compression space P.

Particularly, the piston 6 is elastically supported in the motion direction. In detail, a piston flange 6b protruding in the radial direction from one end of the piston 6 close to the inlet tube 2a is elastically supported in the motion direction of the piston 6 by mechanical springs 8a and 8b such as coil springs. In addition, the refrigerant filled in the compression space P opposite to the inlet tube 2a operates as a gas spring by a self elastic force, and thus elastically supports the piston 6.

The mechanical springs 8a and 8b have a constant mechanical spring constant K regardless of a load. Preferably, the mechanical springs 8a and 8b are installed at a supporting frame 26 fixed to the linear motor 10 and the cylinder 4, respectively, to be positioned side by side in the axial direction from the piston flange 6b. Preferably, the mechanical spring 8a supported on the supporting frame 26 and the mechanical spring 8b installed in the cylinder 4 are configured to have the same mechanical spring constant $K_m$.

Still referring to FIG. 3, the linear motor 10 includes an inner stator 12 formed by laminating a plurality of laminations 12a in the circumferential direction, and fixed to the outside of the cylinder 4 by the frame 18, an outer stator 14 formed by laminating a plurality of laminations 14b in the circumferential direction around a coil winding portion 14a wound with a coil, and installed outside the cylinder 4 by the frame 18 with a predetermined gap from the inner stator 12, and a permanent magnet 16 positioned in the gap between the inner stator 12 and the outer stator 14, and connected to the piston 6 by the connection member 17. The coil winding portion 14a can be fixed to the outside of the inner stator 12.

Figure 4:
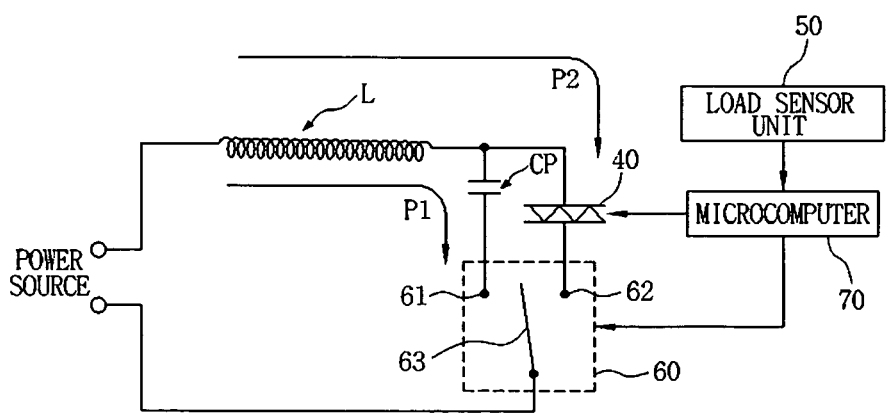
FIG. 4 is a configuration view illustrating a controlling apparatus for a linear compressor in accordance with the present invention.

FIG. 4 is a configuration view illustrating a controlling apparatus for a linear compressor in accordance with the present invention. As illustrated in FIG. 4, the controlling apparatus includes a coil winding portion L (identical to 14a of FIG. 3) of a linear motor 10 connected in series to a power source, a capacitor CP connected in series to the coil winding portion L, a triac 40 which is a phase control means connected in series to the coil winding portion L, a load sensor unit 50 for sensing a load of the linear compressor, a switch means 60 for supplying power to one of the capacitor CP and the triac 40, and a microcomputer 70 for controlling the switch means 60 and the triac 40 according to the load from the load sensor unit 50.

In detail, the controlling apparatus is characterized by an LC path P1 formed of the serial connection of the coil winding portion L and the capacitor CP, a phase control path P2 formed of the serial connection of the coil winding portion L and the triac 40, and a switch means 60 for applying power through one of the LC path P1 and the phase control path P2.

Here, the load sensor unit 50 serves to sense the load of the linear compressor. The load sensor unit 50 can sense a load degree by sensing a voltage, a current and a frequency applied to the linear motor 10. In addition, the load sensor unit 50 can sense the load degree by sensing temperatures of a sucked refrigerant and a discharged refrigerant. The load sensor unit 50 is a means for sensing the load degree by various devices.

The switch means 60 includes a first contact point 61 connected to the LC path P1, a second contact point 62 connected to the phase control path P2, and a selecting means 63 connected to one of the first contact point 61 and the second contact point 62, for applying power.

Basically, the microcomputer 70 stores reference data for judging the degree of the load sensed by the load sensor unit 50. The reference data are used to determine whether the current load is in a high load state, a middle load state or a low load state. The microcomputer 70 discriminates the degree of the current load according to the reference data.

When the current load is in the middle load state, since the variation of the load is not serious, even if the common AC power is used without additional control, there is no big difference in the freezing capability generated by the linear compressor. Therefore, the microcomputer 70 supplies power through the LC path P1. As in the conventional art, so far as a resonance frequency (an LC resonance frequency on the LC path P1) is set higher than a frequency of the common AC power, it is possible to generate an appropriate cooling force for the current load without controlling the triac 40 by the microcomputer 70.

When the current load is in the high or low load state, since the variation of the load is serious, the microcomputer 70 supplies the common AC power through the phase control path P2, and performs a phase control on the common AC power. As any capacitor is not connected to the phase control path P2, a phase of a current flowing through the phase control path P2 is equal to or follows a phase of a voltage applied to the triac 40, so that the microcomputer 70 can easily control the phase of the current through the triac 40. Particularly, the current flowing through the phase control path P2 is affected by the load degree. Accordingly, when the phase of the voltage is equal to or precedes the phase of the current on the phase control path P2, the phase difference can be minimized by controlling a mass of a piston 6 in the design of the linear compressor.

That is, the microcomputer 70 controls the selecting means 63 in cooperation with the load degree, to thereby perform various control modes. As a result, the selecting means 63 operates in cooperation with the load degree.

Figure 1:
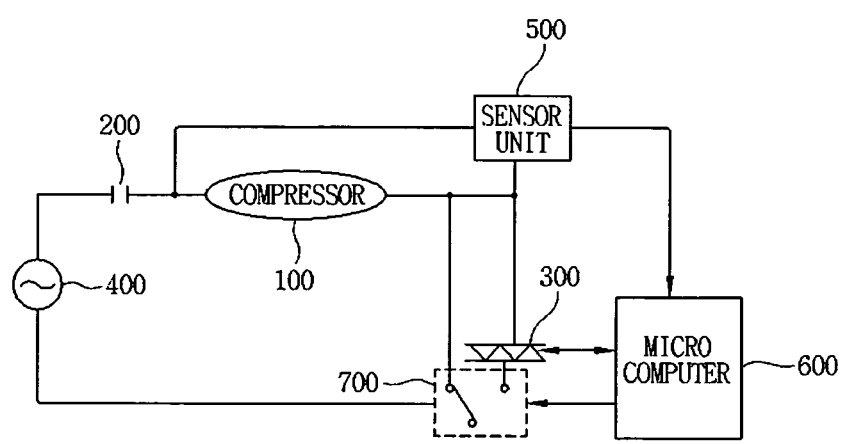
FIG. 1 is a configuration view illustrating a conventional controlling apparatus for a linear compressor.
Figure 2:
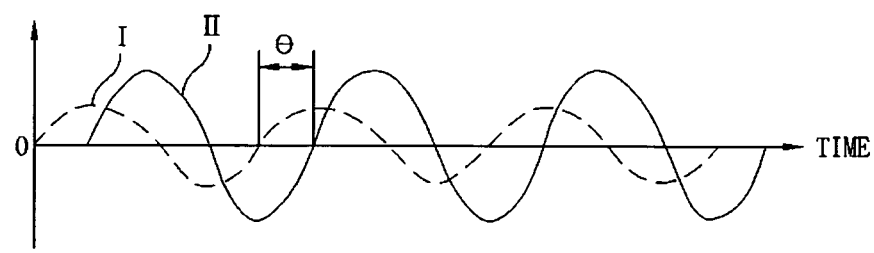
FIG. 2 is a graph showing current and voltage waveforms in FIG. 1.
Figure 5:
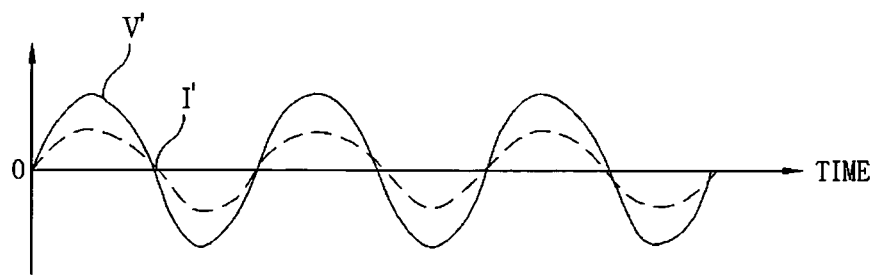
FIG. 5 is a graph showing current and voltage waveforms of a phase control mode in FIG. 4.

FIG. 5 is a graph showing current and voltage waveforms of the phase control mode in FIG. 4. As shown in FIG. 5, a phase of a voltage V' is equal to a phase of a current I' on the phase control path P2. If the triac 40 is controlled when the voltage V' is over 0 V, since the size of the current I' is in an increasing state, a driving force, namely, a cooling force can be varied according to the load degree, and a cooling force suitable for a high load can be generated. In relation to the consumed power of the linear compressor, as the overlapping region of the voltage V' and the current I' is wider than that of FIG. 2, efficiency of the consumed power can be improved.

Figure 6:
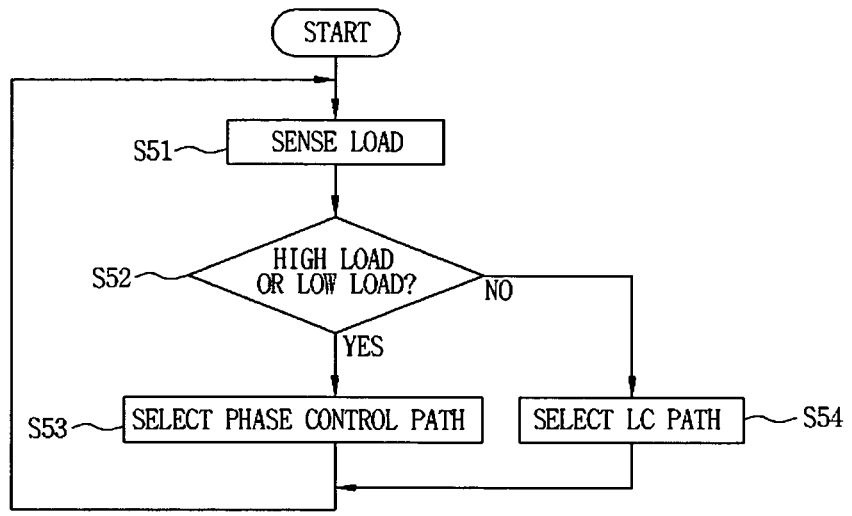
FIG. 6 is a flowchart showing sequential steps of a controlling method for a linear compressor in accordance with the present invention.

FIG. 6 is a flowchart showing sequential steps of a controlling method for a linear compressor in accordance with the present invention.

In detail, in step S51, the microcomputer 70 judges the current load degree of the linear compressor according to the sensing result of the load sensor unit 50.

In step S52, the microcomputer 70 judges whether the current load degree is in the high or low load state. If the current load degree is in the high or low load state, the microcomputer 70 goes to step S53, and if not, the microcomputer 70 goes to S54.

In step S53, the microcomputer 70 controls the switch means 60 so that power can be applied to the phase control path P2, and additionally controls the triac 40 so that the linear compressor can generate the cooling force according to the high or low load state.

In step S54, the microcomputer 70 controls the switch means 60 so that power can be applied to the LC path P1. The common AC power is applied directly to the linear compressor through the LC path P1, for operating the linear compressor.

After the steps S53 and S54, the microcomputer 70 goes to step S51, and continuously performs the controlling method according to the present invention.

Although the preferred embodiments of the present invention have been described, it is understood that the present invention should not be limited to these preferred embodiments but various changes and modifications can be made by one skilled in the art within the spirit and scope of the present invention as hereinafter claimed.

The invention claimed is:

1. A controlling apparatus for a linear compressor, comprising:
    a coil winding portion of the linear compressor connected in series to a power source;
    a capacitor connected in series to the coil winding portion;
    a phase control means connected in series to the coil winding portion; and
    a switch means for selectively applying power to one of the capacitor and the phase control means,
    wherein the power is selectively applied to the connection of the coil winding portion and the capacitor or the connection of the coil winding portion and the phase control means.

2. The controlling apparatus of claim 1, comprising a control means for controlling the switch means according to a load degree of the linear compressor.

3. A controlling method for a linear compressor, comprising the steps of:
    judging a load state of the linear compressor; and
    selecting an LC path including a capacitor connected in series to the coil winding portion or a phase control path including a phase control means connected in series to the coil winding portion according to the load state,
    wherein power is selectively applied to the LC path or the phase control path.

4. The controlling method of claim 3, wherein the selecting step selects the phase control path when the load state is a high load or a low load, and selects the LC path when the load state is a middle load.

5. A controlling apparatus for a linear compressor, comprising:
    a coil winding portion of the linear compressor with one end connected to an external power source;
    a capacitor with one end connected to the other end of the coil winding portion and the other end connected to a first contact point of a switch unit;
    a phase control unit with one end connected to the other end of the coil winding portion and the other end connected to a second contact point of the switch unit; and
    the switch unit including the first contact point, the second contact point, and a selecting unit with one end selectively connected to the first contact point or the second contact point and the other end connected to the external power source, and selectively applying external power to the capacitor or the phase control unit,
    wherein the external power is selectively applied to the connection of the coil winding portion and the capacitor or the connection of the coil winding portion and the phase control means.

6. The controlling apparatus of claim 5, wherein the selecting unit operates in cooperation with a load degree of the linear compressor.

7. The controlling apparatus of claim 6, wherein the selecting unit applies power to the phase control unit when the load degree is a high load or a low load, and applies power to the capacitor when the load degree is a middle load.

* * * * *